US008655272B2

(12) United States Patent  
Saunamäki (10) Patent No.: US 8,655,272 B2  
(45) Date of Patent: Feb. 18, 2014

(54) WIRELESS CHARGING COIL FILTERING (75) Inventor: Esa Ilmari Saunamäki, Virrat (FI)

(73) Assignee: Nokia Corporation, Espoo (FI)

( * ) Notice: Subject to any disclaimer, the term of this patent is extended or adjusted under 35 U.S.C. 154(b) by 751 days.

(21) Appl. No.: 12/498,872

(22) Filed: Jul. 7, 2009

(65) Prior Publication Data  
US 2011/0009057 A1 Jan. 13, 2011

(51) Int. Cl.  
*H04B 5/00* (2006.01)

(52) U.S. Cl.  
USPC .......... 455/41.1; 455/572; 455/298; 455/299; 455/307

(58) Field of Classification Search  
USPC ................................................ 455/41.1, 41.2  
See application file for complete search history.

(56) References Cited

U.S. PATENT DOCUMENTS

| | | | |
|---|---|---|---|
| 4,278,941 A | 7/1981 | Freedman |
| 4,662,001 A | 4/1987 | Cruz et al. |
| 5,157,362 A | 10/1992 | Zelenz |
| 5,565,756 A | 10/1996 | Urbish et al. |
| 5,596,567 A | 1/1997 | deMuro et al. |
| 5,805,067 A | 9/1998 | Bradley et al. |
| 5,963,012 A | 10/1999 | Garcia et al. |
| 6,002,237 A | 12/1999 | Gaza |
| 6,020,783 A | 2/2000 | Coppola |
| 6,054,927 A | 4/2000 | Brickell |
| 6,242,888 B1 | 6/2001 | Cerf |
| 6,501,246 B2 | 12/2002 | You et al. |
| 6,617,827 B2 | 9/2003 | Knish et al. |
| 6,792,297 B2 | 9/2004 | Cannon et al. |
| 6,828,759 B1 | 12/2004 | Xiong et al. |
| 6,977,479 B2 | 12/2005 | Hsu |
| 7,180,265 B2 | 2/2007 | Naskali et al. |
| 7,199,554 B2 | 4/2007 | Kim et al. |
| 7,202,634 B2 | 4/2007 | Bucur |

(Continued)

FOREIGN PATENT DOCUMENTS

| | | |
|---|---|---|
| FR | 2868542 A1 | 10/2005 |
| GB | 2413458 | 10/2005 |

(Continued)

OTHER PUBLICATIONS

Z. N. Low, et al., "Design and Test of a High-Power High-Efficiency Loosely Coupled Planar Wireless Power Transfer System" IEEE Transactions on Industrial Electronics, vol. 56, No. 5, May 2009.

(Continued)

*Primary Examiner* — Nay A Maung  
*Assistant Examiner* — Erica Fleming-Hall  
(74) *Attorney, Agent, or Firm* — Locke Lord LLP (57) ABSTRACT

Example embodiments are disclosed for limiting radio frequency noise created during wireless charging of rechargeable batteries in radio frequency communication devices. In an example embodiment, a power source circuit in a wireless charging device produces a source alternating current. The source alternating current is passed through a radio frequency blocking filter to limit radio frequency noise. The filtered source alternating current is then driven through a transmitting coil in the charging device, which inductively couples with a proximately located receiving coil in a radio frequency communication device. An induced alternating current is passed through a second radio frequency blocking filter in the communication device, which limits radio frequency noise that could otherwise be created by the rectifier and control circuits in the communication device.

13 Claims, 8 Drawing Sheets

(56) References Cited

U.S. PATENT DOCUMENTS

| | | |
|---|---|---|
| 7,205,747 B2 | 4/2007 | Wu |
| 2002/0028699 A1 | 3/2002 | Moquin et al. |
| 2002/0089305 A1 | 7/2002 | Park et al. |
| 2003/0231001 A1 | 12/2003 | Bruning |
| 2004/0203478 A1* | 10/2004 | Scott .................. 455/70 |
| 2004/0221183 A1 | 11/2004 | Lu |
| 2005/0001595 A1* | 1/2005 | May et al. .............. 320/140 |
| 2006/0202665 A1 | 9/2006 | Hsu |
| 2007/0145830 A1* | 6/2007 | Lee et al. ............... 307/135 |
| 2007/0229279 A1* | 10/2007 | Yamazaki et al. ...... 340/572.7 |
| 2007/0279002 A1 | 12/2007 | Partovi |
| 2008/0220831 A1 | 9/2008 | Alameh et al. |
| 2008/0238364 A1* | 10/2008 | Weber et al. ............ 320/108 |
| 2008/0303479 A1 | 12/2008 | Park et al. |
| 2009/0157145 A1* | 6/2009 | Cauller ................... 607/60 |
| 2009/0179502 A1 | 7/2009 | Cook et al. |
| 2009/0284082 A1 | 11/2009 | Mohammadian |
| 2010/0007307 A1* | 1/2010 | Baarman et al. .......... 320/108 |
| 2010/0036773 A1* | 2/2010 | Bennett ................... 705/67 |
| 2010/0190435 A1* | 7/2010 | Cook et al. ............... 455/41.1 |
| 2010/0222010 A1* | 9/2010 | Ozaki et al. .............. 455/77 |

FOREIGN PATENT DOCUMENTS

| | | |
|---|---|---|
| WO | 03105311 A1 | 12/2003 |
| WO | WO2006001557 | 1/2006 |
| WO | WO2008145982 | 12/2008 |
| WO | 2009037380 A1 | 3/2009 |

OTHER PUBLICATIONS

T.C. Yo, et al., "Compact Circularly Polarized Rectenna with Unbalanced Circular Slots", IEEE transactions on Antennas and Propagation, vol. 56, No. 3, Mar. 2008.

International Search Report dated Jul. 7, 2009 for International Application No. PCT/FI2010/050431.

International Search Report mailed Mar. 8, 2011 in International Application No. PCT/FI2010/050877, 5pp.

International Search Report for International Application No. PCT/IB2010/053958 dated Jan. 14, 2011.

U.S. Appl. No. 12/620,861, filed Nov. 18, 2009, Esa Ilmari Saunamäki.

U.S. Appl. No. 12/554,468, filed Sep. 4, 2009, Esa Ilmari Saunamäki.

* cited by examiner

WIRELESS CHARGING COIL FILTERING

FIELD

The technical field relates to wireless charging of batteries in portable devices. More particularly, the technical field relates to techniques for reducing RF (radio frequency) noise while charging a communications device with a wireless charger.

BACKGROUND

Rechargeable batteries in cellular phones and other portable communication devices, such as NiCd, nickel-metal hydride (NiMH), Lithium-ion, and Lithium-Polymer batteries, can be recharged with household alternating current (AC) power coupled through a voltage reduction transformer, an alternating-to-direct current converter, and appropriate battery monitoring and charging circuits. They can also be recharged with a 12-volt cigarette lighter socket provided in an automobile coupled through a DC voltage reduction circuit and appropriate battery monitoring and charging circuits. However, in both cases, the portable communication device must be plugged into the household AC power source or into the automobile power source, limiting the mobility of the communication device.

Recently, wireless charging has become available for rechargeable batteries in cellular phones and other portable communication devices, using contact-less electromagnetic induction. A power source circuit in a wireless charging device drives a resonant frequency oscillator that produces a source alternating current in a frequency range between 50 kHz and 20 MHz, which is driven through a transmitting coil in the charging device. The alternating magnetic field produced by the transmitting coil inductively couples with a corresponding receiving coil in the cellular phone or other portable communication device, thereby producing a corresponding induced alternating current that drives an oscillator at its resonant frequency in the range between 50 kHz and 20 MHz to produce an output AC voltage. A conversion circuit in the cellular phone or other portable communication device, uses a transformer to adjust the output AC voltage, an alternating-to-direct current converter, and appropriate battery monitoring and charging circuits to produce an appropriate DC charging voltage for the rechargeable battery.

SUMMARY

Example embodiments are disclosed for limiting radio frequency noise created during wireless charging of rechargeable batteries in radio frequency (RF) communication devices. Moreover, RF performance is improved by limiting spurious emissions, RF noise, and harmonics generated in rectifier and control circuits. In an example embodiment, a power source circuit in a wireless charging device produces a source alternating current in a frequency range between 50 kHz and 20 MHz. The source alternating current is passed through a radio frequency blocking filter to limit radio frequency noise. The filtered source alternating current is then driven through a transmitting coil in the charging device. The alternating magnetic field produced by the transmitting coil inductively couples with a proximately located receiving coil in a radio frequency communication device, using contact-less electromagnetic induction. The radio frequency communication device may be a mobile communications device, FM radio, two-way radio, PDA, cell phone, laptop or palmtop computer, or the like. The alternating magnetic field produces a corresponding induced alternating current in a frequency range between 50 kHz and 20 MHz in the corresponding receiving coil in the radio frequency communication device. The induced alternating current is passed through a second radio frequency blocking filter to rectifier and control circuits. The rectifier and control circuits on communication device side may generate radio frequency noise and the second radio frequency filter reduces the RF noise level in the receiving coil. The filtered induced alternating current is rectified to an appropriate DC charging voltage for the rechargeable battery. In this manner, radio frequency noise is limited during wireless charging of rechargeable batteries in radio frequency communication devices, to reduce the effects of such noise on the communication circuits and the RF antenna of the communication device. In embodiments, the second radio frequency blocking filter may optionally be omitted in the radio frequency communication device, relying on the effective filtering of the first filter in the wireless charger. In other embodiments, the first radio frequency blocking filter may optionally be omitted in the wireless charging device, relying on the effective filtering of the second filter in the communication device.

In embodiments, the signal strength of the filtered signal passed through the radio frequency blocking filter may have the characteristics of a notch filter or low pass filter with a high attenuation at certain frequencies, such as mobile phone frequencies.

In embodiments, the radio frequency blocking filters attenuate radio frequency signals from entering the switch and control circuits of the wireless charger and from entering the rectifier and interface circuits of the communication device, and thus prevent generation of unwanted harmonic frequencies that may contaminate the user's communications signals.

In embodiments, the radio frequency inductors on the first and/or second radio frequency blocking filter make the wireless charger coil less visible to the communication antenna and thus the wireless charger coil has less of an effect on antenna performance.

In embodiments, the receiving coil and the transmitting coil are printed wiring coils configured to be positioned in a coplanar, juxtaposed relationship in close proximity to one another to enhance contact-less electromagnetic induction between them.

DESCRIPTION OF THE FIGURES

FIG. 4B1 illustrates an example graph of the frequency response of an alternate radio frequency blocking filter having one capacitor in the filter circuit with a low impedance providing high attenuation at mobile phone frequencies of 900 MHz.

FIG. 4B2 illustrates an example graph of the frequency response of an alternate radio frequency blocking filter having two capacitors in parallel in the filter circuit with a low impedance providing a high attenuation at mobile phone frequencies of 900 MHz and 1900 MHz.

FIG. 4B3 illustrates an example graph of the frequency response of an alternate radio frequency blocking filter having three capacitors in the filter circuit with a low impedance providing a high attenuation at a frequency of 100 MHz and a high attenuation at mobile phone frequencies of 900 MHz and 1900 MHz.

DISCUSSION OF EXAMPLE EMBODIMENTS OF THE INVENTION

Figure 1:
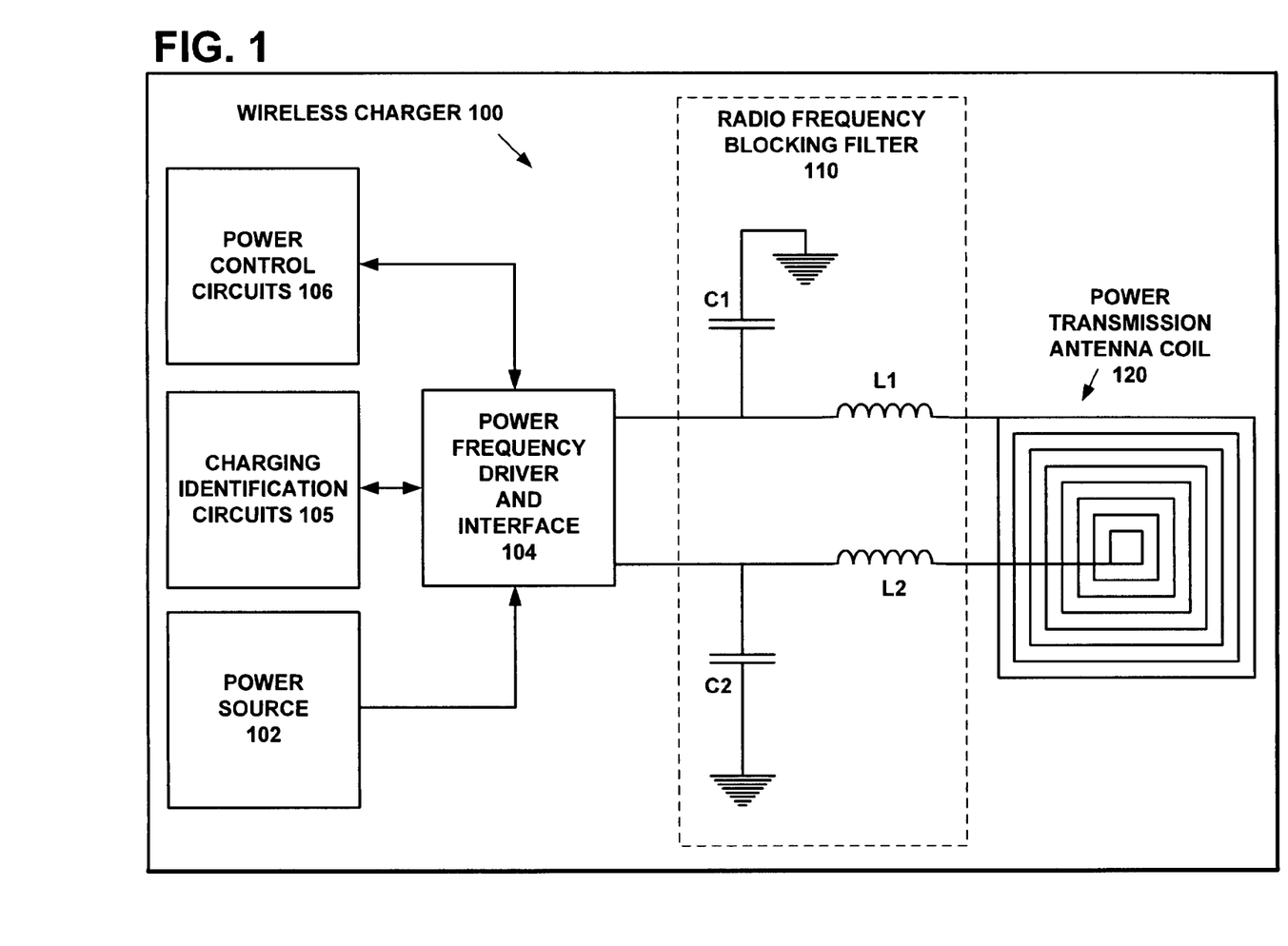
FIG. 1 illustrates an example embodiment for a wireless charger.
Figure 2:
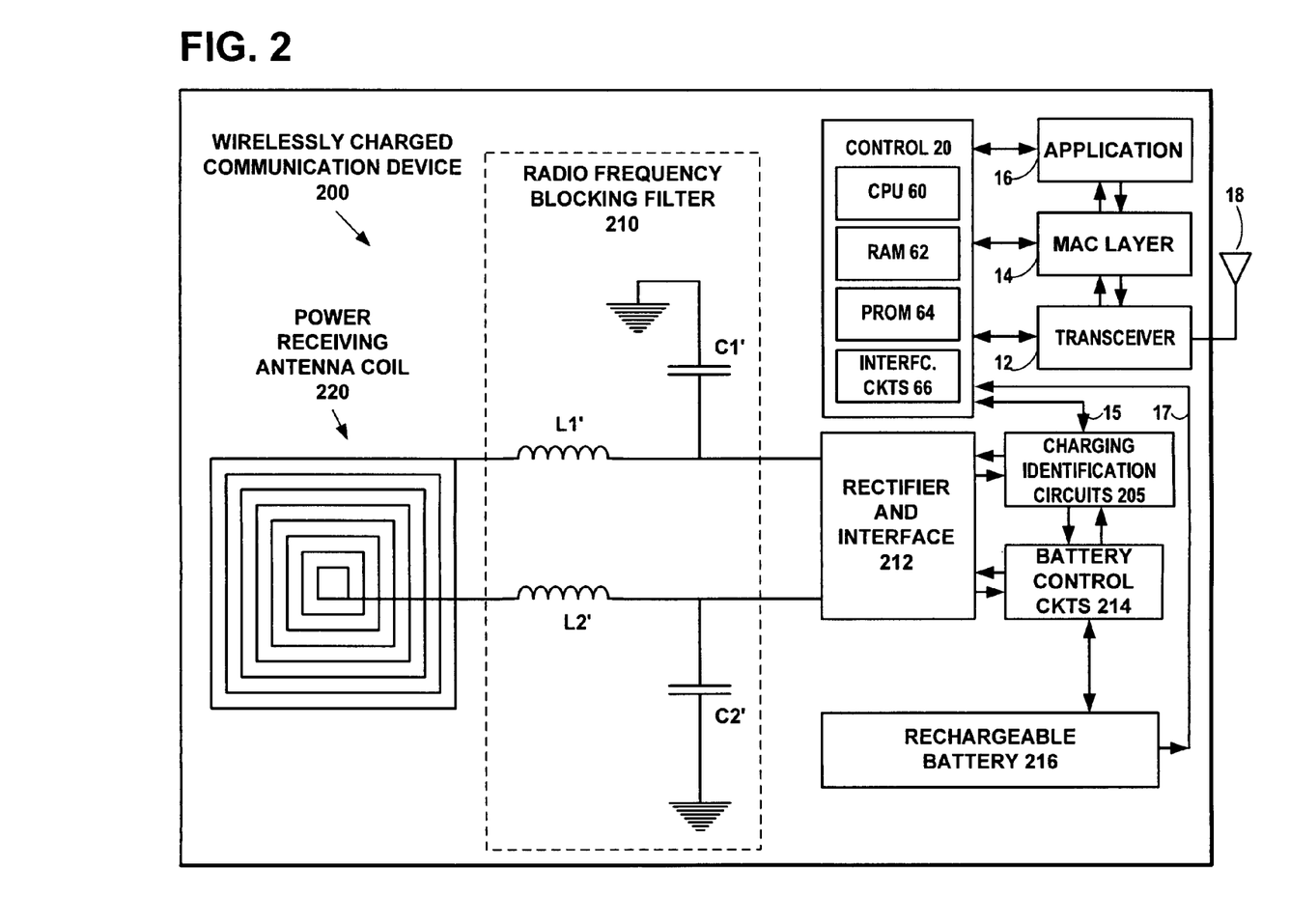
FIG. 2 illustrates an example embodiment for a wirelessly charged communication device.

FIG. 1 illustrates an example embodiment for a wireless charger 100 for limiting radio frequency noise during wireless charging of rechargeable batteries 216 in the radio frequency communication device 200 of FIG. 2. Moreover, RF performance is improved by limiting spurious emissions, RF noise, and harmonics generated in rectifier and control circuits. In an example embodiment, a power source circuit 102 in the wireless charging device 100 drives a power frequency driver and interface 104 that produces a source alternating current in a frequency range between 50 kHz and 20 MHz, which will provide energy to recharge the rechargeable batteries 216. The power control circuits 106 control the power level output by the charger 100. The charging identification circuits 105 identify the target current and voltage to be applied to each type of rechargeable battery. The power frequency driver and interface 104 and the power control circuits 106 may create unwanted radio frequency noise that may adversely affect the operation of the communication circuits 12 and RF antenna 18 of the communication device 200 during battery charging operations. RF noise from charger circuits may leak out via the power transmit and power receive coils to disturb the telephone circuits, decreasing RF sensitivity and causing missed or dropped calls or a "not network available" error.

In the example embodiments, the source alternating current is passed through a radio frequency blocking filter 110 to limit the radio frequency noise that would otherwise reach the communication circuits and RF antenna 18 of the communication device 200.

The filter 110 includes a first RF inductor L1 having a high impedance to frequencies in the carrier frequency range of the communication device 200. The RF inductor L1 may be a ferrite or similar RF inductor. The RF inductor L1 may be implemented as a structure on a printed wiring board and may be implemented as a coil made from the same material as antenna coil 120. The RF inductor L1 may be implemented as a ferrite ring in coil wiring. For example, a cell phone's carrier frequency range is in the GigaHertz frequency range. For example, GSM-900 uses 890-915 MHz to send information from the mobile station to the base station (uplink) and 935-960 MHz to send information from the base station to the mobile station (downlink). As another example, GSM-1800 uses 1710-1785 MHz to send information from the mobile station to the base transceiver station (uplink). As another example, an FM-radio's carrier frequency broadcast band falls within the VHF part of the radio spectrum between 87.5 MHz-108.0 MHz. (The lowest VHF frequency is different in Eastern-Europe and most of the Asian countries. For example, the Russian band ranges from 65-74 MHz and the Japanese band ranges from 76-90 MHz.)

The first RF inductor L1 is serially coupled between a first terminal of the power frequency driver and interface 104 and a first terminal of the power transmission antenna coil 120. The filter includes a first capacitor C1 coupled between the first terminal of the power frequency driver and interface 104 and ground potential, as an RF bypass for the carrier frequency range of the communication device 200. In embodiments of the invention, instead of single capacitor there may be several capacitors to have wideband filtering, with one capacitor optimized for FM radio frequencies and another capacitor may be optimized for GSM frequencies. In embodiments of the invention, capacitor C1 (or C2) is not necessary if the internal capacitance of the circuits coupled to antenna coil, can be used as part of the filtering or if the needed capacitance is already exists from the electrostatic discharge (ESD) filter circuit coupled to the interface. In embodiments of the invention, capacitors C1 (or C2) can also be in the form of a parasitic capacitance in the circuit.

The filter 110 includes a second RF inductor L2 having a high impedance to frequencies in the carrier frequency range of the communication device 200, serially coupled between a second terminal of the power frequency driver and interface 104 and a second terminal of the power transmission antenna coil 120. The filter includes a second capacitor C2 coupled between the second terminal of the power frequency driver and interface 104 and ground potential, as an RF bypass for the carrier frequency range of the communication device 200. The filter limits the radio frequency noise that would otherwise reach the communication circuits and RF antenna 18 of the communication device 200. The filtered source alternating current is then driven through the power transmission antenna coil 120 in the charging device. In this manner, radio frequency noise is limited by the filter 110 during wireless charging of rechargeable batteries in radio frequency communication devices. The radio frequency blocking filter prevents radio frequency noise from entering the switch and control circuits of the wireless charger and from entering the rectifier and interface circuits of the communication device, and thus prevent generation of unwanted harmonic frequencies that may contaminate the user's communications signals.

Figure 3A:
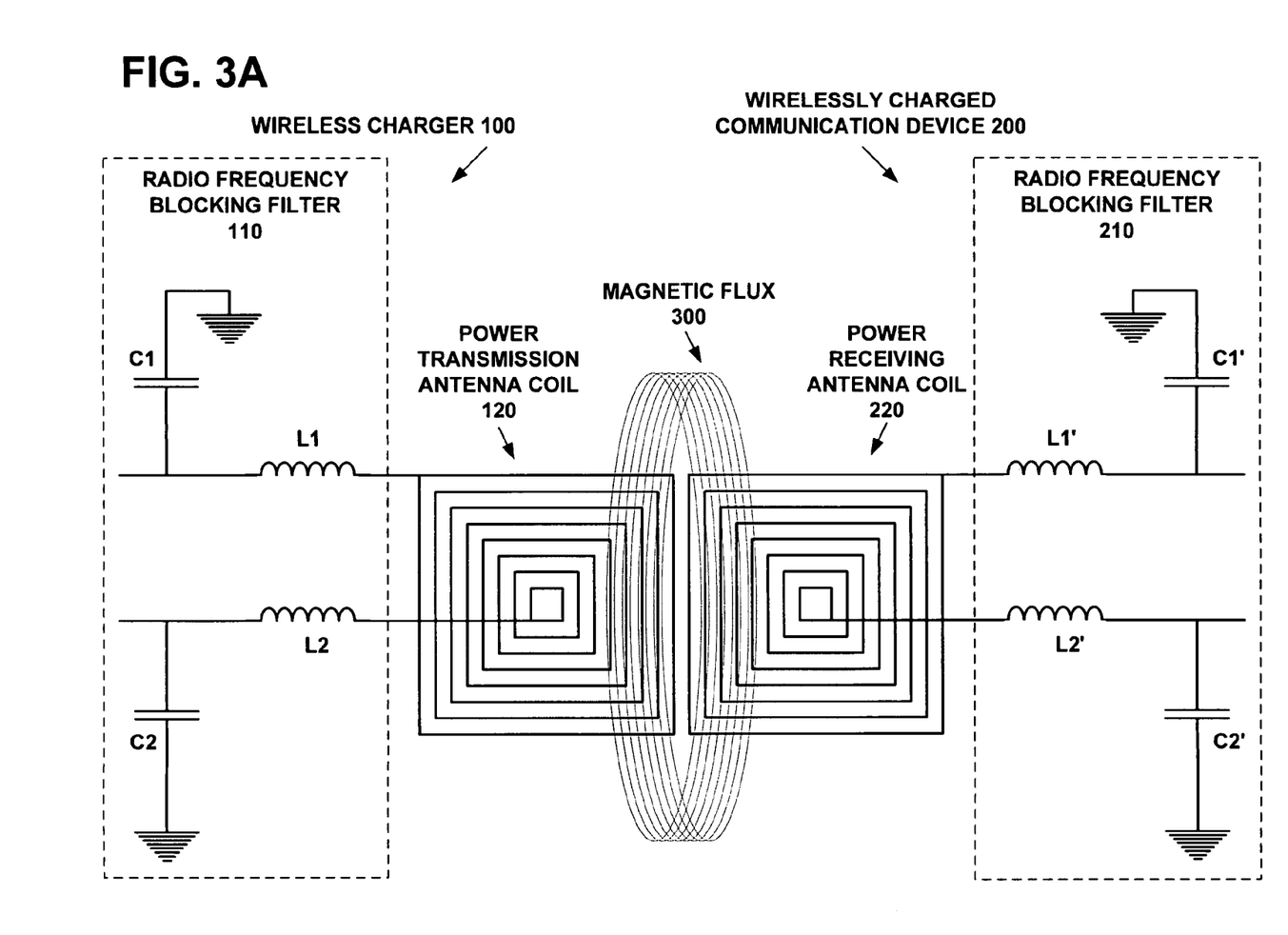
FIG. 3A illustrates an example embodiment for an inductively coupling between a wireless charger and a wirelessly charged communication device.
Figure 3B:
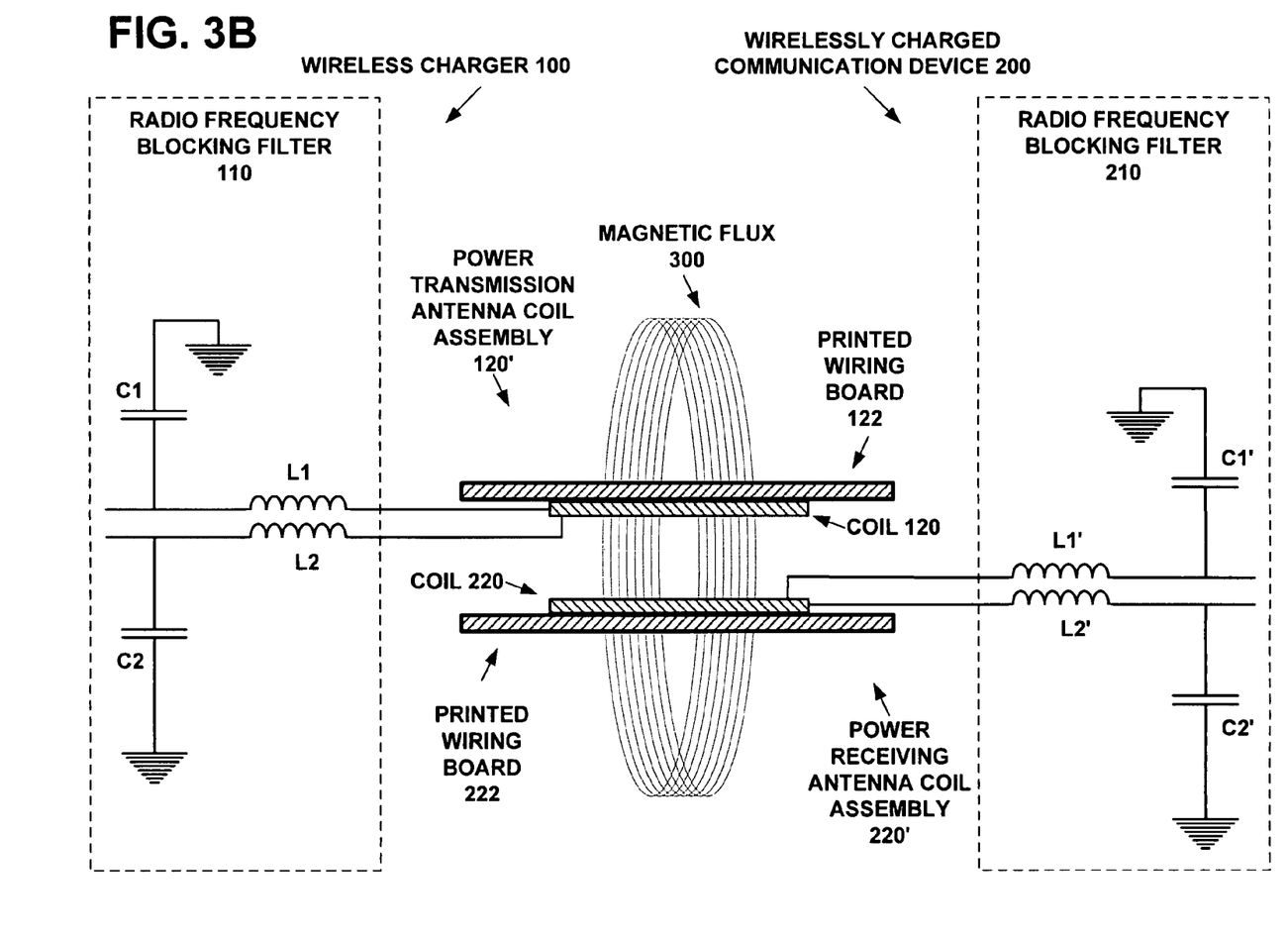
FIG. 3B illustrates an example embodiment for the wireless charger with the power transmission antenna coil being a printed wiring coil on a printed wiring board and the wirelessly charged communication device with the power receiving antenna coil being a printed wiring coil on a printed wiring board.

The alternating magnetic field 300 shown in FIG. 3A, which is produced by the power transmission antenna coil 120, inductively couples with a proximately located receiving antenna coil 220 in the radio frequency communication device 200, using contact-less electromagnetic induction. The two antennas 120 and 220 may be planar coils that are positioned proximate to each other in a coplanar mutual orientation, as shown in FIG. 3B, there the close proximity of the coplanar coils 120 and 220 improves the magnetic coupling between them.

The radio frequency communication device 200 may be a mobile communications device, FM radio, two-way radio, PDA, cell phone, laptop or palmtop computer, or the like. The alternating magnetic field 300 produces a corresponding induced alternating current in the power receiving antenna coil 220. The induced alternating current is passed through a radio frequency blocking filter 210.

The filter 210 includes a first RF inductor L1' having a high impedance to frequencies in the carrier frequency range of the communication device 200, serially coupled between a first terminal of the rectifier and interface 212 and a first terminal of the power receiving antenna coil 220. The RF inductor L1' may be a ferrite or similar RF inductor. The RF inductor L1' may be implemented as a structure on a printed wiring board and may be implemented as a coil made from the same material as antenna coil 220. The RF inductor L1' may be implemented as a ferrite ring in coil wiring. The filter 210 includes a first capacitor C1' coupled between the first terminal of the rectifier and interface 212 and ground potential, as an RF bypass for the carrier frequency range of the communication device 200. In embodiments of the invention, instead of single capacitor there may be several capacitors to have wideband filtering, with one capacitor optimized for FM radio frequencies and another capacitor may be optimized for GSM frequencies.

The filter 210 includes a second RF inductor L2' having a high impedance to frequencies for the carrier frequency range of the communication device 200, serially coupled between a second terminal of the rectifier and interface 212 and a second terminal of the power receiving antenna coil 220. The filter 210 includes a second capacitor C2' coupled between the second terminal of the rectifier and interface 212 and ground potential, as an RF bypass for the carrier frequency range of the communication device 200.

The filtered induced alternating current drives the rectifier and interface 212 in a range between 50 kHz and 20 MHz to produce an appropriate DC charging voltage for the rechargeable battery 216. A battery control circuit 214 in the cellular phone adjusts the DC voltage and current. The charging identification circuits 205 identify the target current and voltage to be applied to each type of rechargeable battery. In this manner, radio frequency noise is limited during wireless charging of rechargeable batteries 216 in radio frequency communication devices 200, to reduce the effects of such noise on the communication circuits 12 and the RF antenna 18 of the communication device 200. The radio frequency blocking filters prevent radio frequency noise from entering the switch and control circuits of the wireless charger and from entering the rectifier and interface circuits of the communication device, and thus prevent generation of unwanted harmonic frequencies that may contaminate the user's communications signals. Without the blocking filters, RF energy can reach non-linear circuits such as the diode and transistor circuits in the rectifier and control block. The RF energy has the effect on non-linear elements of causing unwanted harmonics so that inter-modulation results and the unwanted harmonic signals may be re-radiated. The blocking filters minimize the RF energy reaching non-linear components, thereby limiting spurious emissions, RF noise, and harmonics generated in the rectifier and control circuits.

In embodiments, the second radio frequency blocking filter may be omitted in the radio frequency communication device, where the non-linear circuits in the rectifier and control block are not as prone to generate unwanted harmonic signals. In other embodiments, the second radio frequency blocking filter in the radio frequency communication device may be solely relied upon without having the first radio frequency blocking filter in the charger.

FIG. 3B illustrates an example embodiment for the wireless charger 100 of FIG. 3A with the power transmission antenna coil 120 being a printed wiring coil on a printed wiring board 122 shown in the side view as the assembly 120'. In alternate embodiments, a separate printed wiring board 122 may be omitted and the coil 120 may incorporated into the body of the printed wiring board or it may be glued to a plastic substrate. FIG. 3B also illustrates an example embodiment for the wirelessly charged communication device 200 with the power receiving antenna coil 220 being a printed wiring coil on a printed wiring board 222 shown in the side view as the assembly 220'. In alternate embodiments, a separate printed wiring board 222 may be omitted and the coil 220 may incorporated into the body of the printed wiring board or it may be glued to a plastic substrate. Antenna coils 120 and 220 are planar coils printed on their respective circuit boards 122 and 222. Antenna coils 120 and 220 are shown juxtaposed, coplanar, and in close proximity to enable efficient inductive coupling by the magnetic field 300. The two antennas 120 and 220 are positioned proximate to each other in a coplanar mutual orientation, so that the close proximity of the coplanar coils 120 and 220 improves the magnetic coupling between them. In embodiments of the invention, the RF inductors L1 and L2 may be implemented as structures on the printed wiring board 122 and may be implemented as coils made from the same material as antenna coil 120. Similarly, in embodiments of the invention, the RF inductors L1' and L2' may be implemented as structures on the printed wiring board 222 and may be implemented as coils made from the same material as antenna coil 220. In embodiments of the invention, the RF inductors L1 and L2 may each be implemented as one or more inductances. Similarly, in embodiments of the invention, the RF inductors L1' and L2' may each be implemented as one or more inductances. In embodiments, the RF inductors on the first and/or second radio frequency blocking filter enable the use of the wireless charger coil structure as an internal antenna for wireless communication in high frequencies. In embodiments, an additional ferromagnetic foil may be affixed to the backside of the coils 120 and 220 to shield any stray magnetic flux.

Figure 4A:
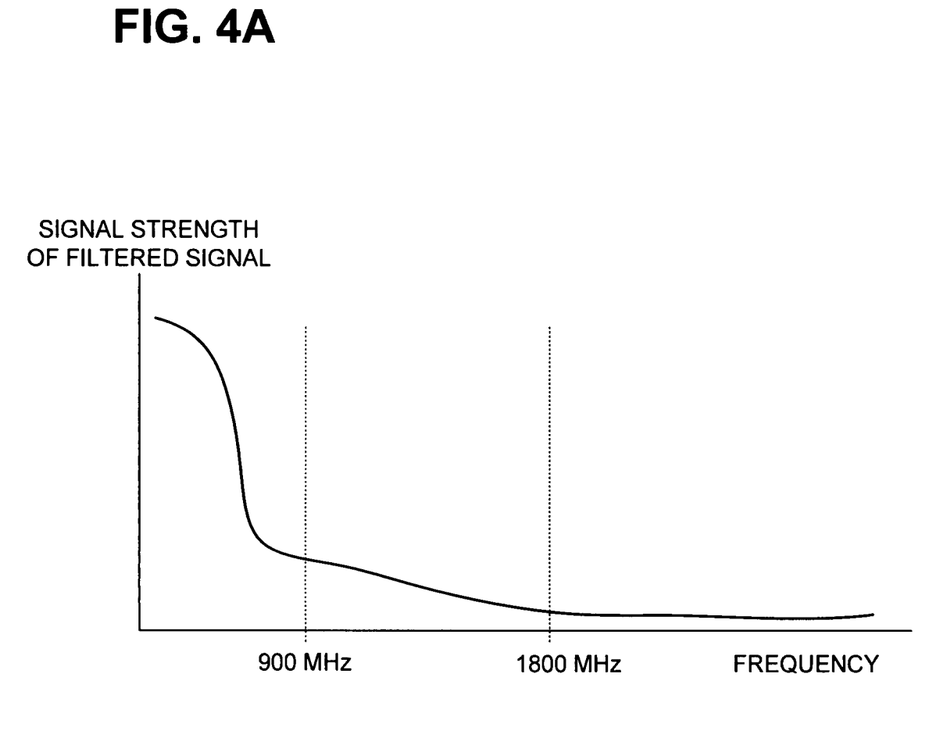
FIG. 4A illustrates an example graph of the signal strength of the filtered signal passed through a radio frequency blocking filter.

FIG. 4A illustrates an example graph of the signal strength of the filtered signal passed through the radio frequency blocking filter.

Figure 4B:
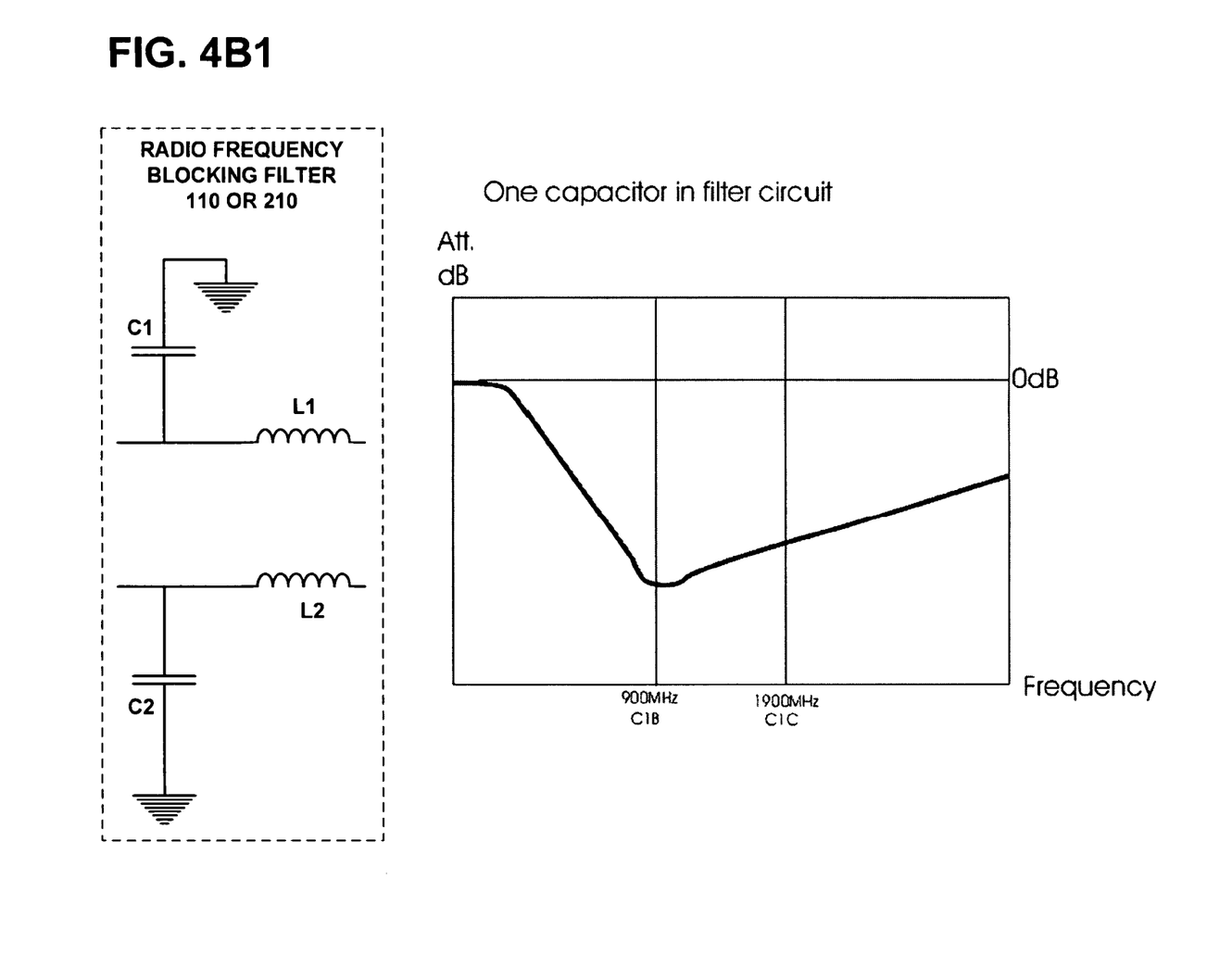

FIG. 4B1 illustrates an example graph of the frequency response of an alternate radio frequency blocking filter having one capacitor C1 in the filter circuit with a low impedance providing a high attenuation at mobile phone frequencies of 900 MHz.

Figure 4B:
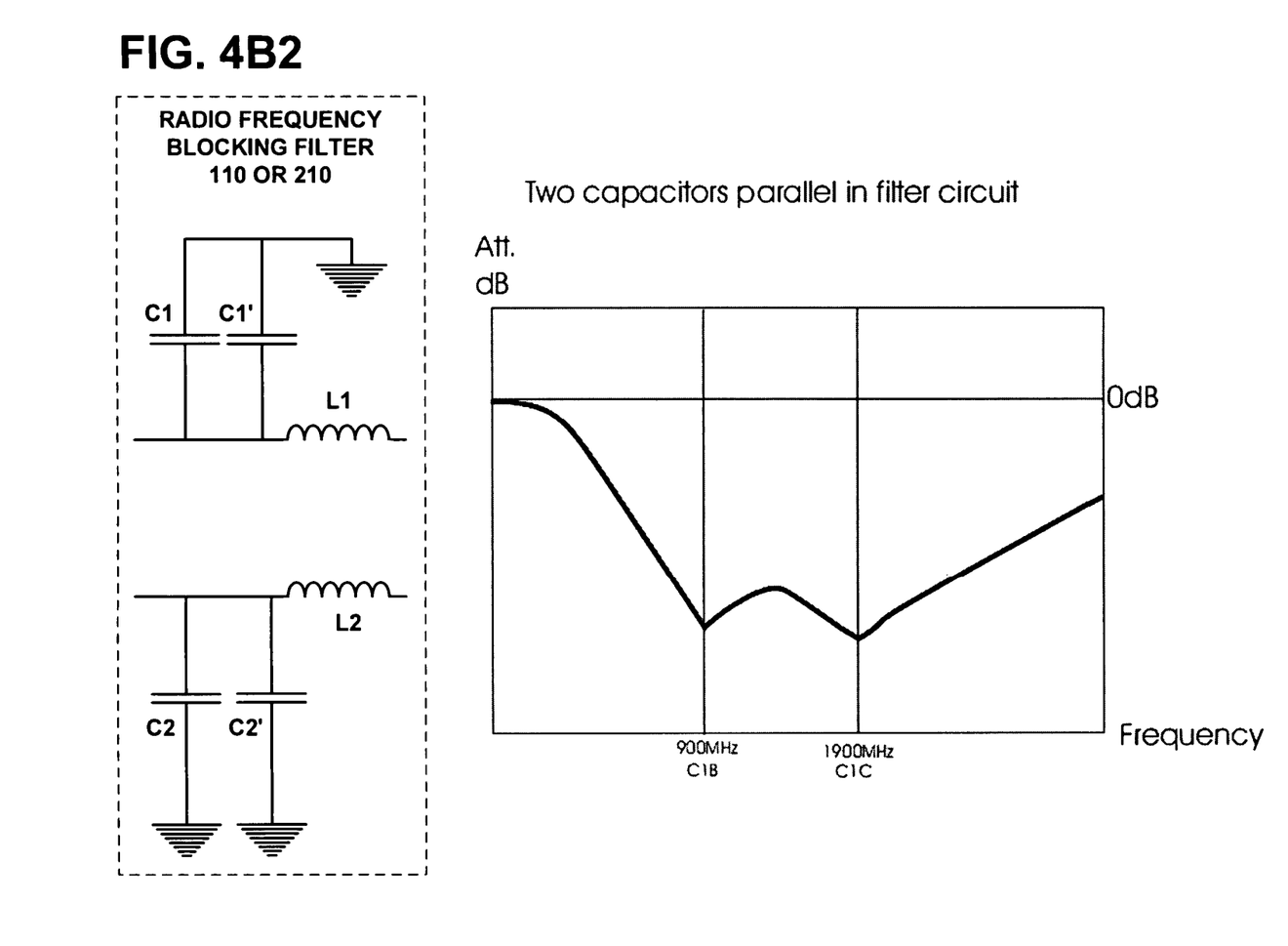

FIG. 4B2 illustrates an example graph of the frequency response of an alternate radio frequency blocking filter having two capacitors C1 and C1' in parallel and two capacitors C2 and C2' in the filter circuit with a low impedance providing a high attenuation at mobile phone frequencies of 900 MHz and 1900 MHz.

Figure 4B:
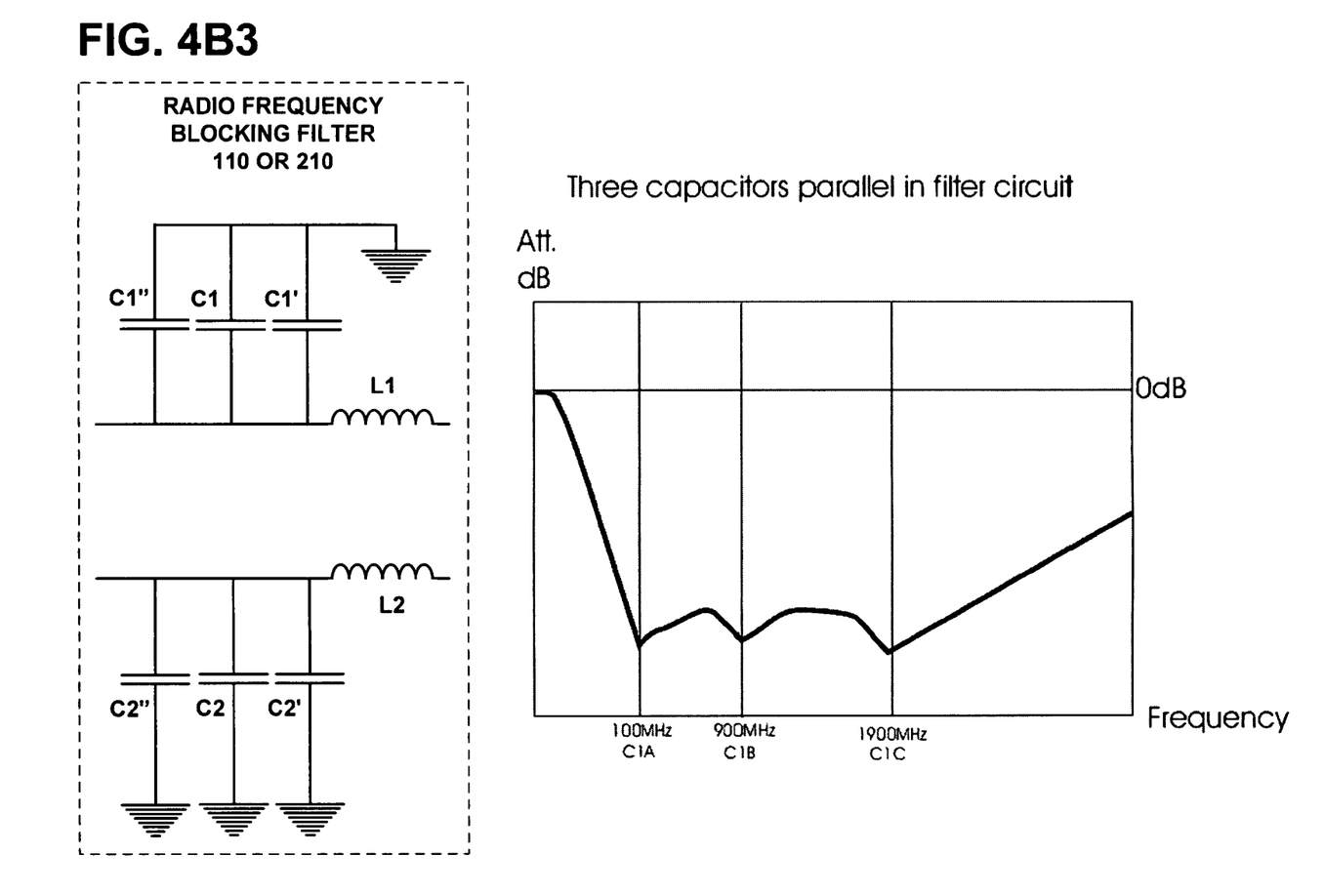

FIG. 4B3 illustrates an example graph of the frequency response of an alternate radio frequency blocking filter having three capacitors C1, C1', and C1" and three capacitors C2, C2', and C2" in the filter circuit with a low impedance providing a high attenuation at a frequency of 100 MHz and a high attenuation at mobile phone frequencies of 900 MHz and 1900 MHz.

FIG. 2 shows a functional block diagram of an example embodiment of the wireless communications device 200. The wireless device 200 may be for example a mobile communications device, FM-radio, two-way radio, PDA, cell phone, laptop or palmtop computer, or the like. The wireless device 200 includes a control module 20, which includes a central processing unit (CPU) 60, a random access memory (RAM) 62, a read only memory (ROM) 64, and interface circuits 66 to interface with the transceiver 12, battery and other energy sources, key pad, touch screen, display, microphone, speakers, ear pieces, camera or other imaging devices, etc. The RAM 62 and ROM 64 can be removable memory devices such as smart cards, SIMs, WIMs, semiconductor memories such as RAM, ROM, PROMS, flash memory devices, etc. The application and MAC layer may be embodied as program logic stored in the RAM 62 and/or ROM 64 in the form of sequences of programmed instructions which, when executed in the CPU 60, carry out the functions of the disclosed embodiments. The program logic can be delivered to the writeable RAM, PROMS, flash memory devices, etc. 62 of the wireless device 200 from a computer program product or article of manufacture in the form of computer-usable media such as resident memory devices, smart cards or other removable memory devices. Alternately, the MAC layer and application program can be embodied as integrated circuit logic in the form of programmed logic arrays or custom designed application specific integrated circuits (ASIC).

Embodiments of the invention address several issues related to low frequency wireless chargers:

1. The filter circuit 110 placed between the antenna coil 120 and the electronics in the wireless charger 100 ensures that noise from electronic circuits will not leak out via the charger antenna coil structure 120 and couple to RF communications antenna 18. Without the filter circuit 110, RF sensitivity decreases and use of the wireless charger may disturb communication with base station.

2. The filter circuit 210 prevents the communications RF signal from entering the wireless charger circuits and therefore causing spurious RF noise. Without the filter circuit 210, RF harmonics may be generated in the circuits coupled to the charger's antenna coil 120. Example measurements show that when a cell phone is transmitting and is close to a wireless charger, the level of second harmonics increase substantially.

3. When the inductor L1 and L2 in the filter circuit 110 are selected to have a high impedance in mobile phone frequencies, the charger's antenna coil structure 120 is in a high impedance state and it's "floating" from the RF point of view, thus limiting antenna resonances or distortion of the radiation pattern of the RF antenna 18.

4. The inductor in the filter circuit 110 of the wireless charger may be tuned to other frequencies such as FM-radio, DVH, and the like.

5. Typically wireless chargers caused RF noise. Thus, without proper filtering, it might be not possible to use an FM-radio at the same time that a wireless charger is active or the received signal may be distorted during the active charging. The filter circuit 110 and/or 120 may be tuned to attenuate noise at FM-radio frequencies.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. An apparatus, comprising:
a power source circuit in a wireless charging device configured to produce a source alternating current in a frequency range less than radio frequency;
a radio frequency blocking filter coupled to the power source, configured to limit radio frequency noise;
a transmitting coil coupled to the blocking filter, configured to inductively couple with a proximately located receiving coil in a radio frequency communication device, using contact-less electromagnetic induction, to wirelessly provide power with reduced radio frequency noise;
a first RF inductor in the filter, coupled between said power source and a first terminal of said transmitting coil, having a high impedance to frequencies in a carrier frequency range of the radio frequency communication device, to limit transferring the radio frequency noise;
a first capacitance in the filter, coupled between said power source and ground potential, configured as an RF bypass for the carrier frequency range of the communication device, to bypass to ground the radio frequency noise;
a second RF inductor in the filter, coupled between said power source and a second terminal of said transmitting coil, having a high impedance to frequencies in the carrier frequency range of the radio frequency communication device, to limit transferring the radio frequency noise; and
a second capacitance in the filter, coupled between said power source and ground potential, configured as an RF bypass for the carrier frequency range of the communication device, to bypass to ground the radio frequency noise.

2. The apparatus of claim 1, which further comprises:
said filter configured to limit radio frequency noise in a carrier frequency range of the radio frequency communication device.

3. The apparatus of claim 1, which further comprises:
said carrier frequency range being selected from the group consisting of a cell phone's carrier frequency range and an FM-radio's carrier frequency range.

4. An apparatus, comprising:
a receiving coil in a radio frequency communication device, configured to inductively couple with an alternating magnetic field produced by a proximately located transmitting coil of a wireless charger, using contact-less electromagnetic induction to produce a corresponding induced alternating current in the receiving coil, to wirelessly receive power from the charging device;
a radio frequency blocking filter coupled to the receiving coil, configured to pass said power as induced alternating current and limit radio frequency noise;
a radio frequency communication circuit coupled to the radio frequency blocking filter, configured to receive said power with reduced radio frequency noise;
a first RF inductor in the filter, coupled between a first terminal of said receiving coil and said radio frequency communication circuit, having a high impedance to frequencies in a carrier frequency range of the radio frequency communication device, to limit transferring the radio frequency noise;
a first capacitor in the filter, coupled between said first terminal of said receiving coil and ground potential, configured as an RF bypass for the carrier frequency range of the communication device, to bypass to ground the radio frequency noise;

a second RF inductor in the filter, coupled between a second terminal of said receiving coil and said radio frequency communication circuit, having a high impedance to frequencies in the carrier frequency range of the radio frequency communication device, to limit transferring the radio frequency noise; and a second capacitor in the filter, coupled between said second terminal of said receiving coil and ground potential, configured as an RF bypass for the carrier frequency range of the communication device, to bypass to ground the radio frequency noise.

5. The apparatus of claim 4, which further comprises:

said filter configured to limit radio frequency noise in a carrier frequency range of the radio frequency communication device.

6. The apparatus of claim 5, which further comprises:

said carrier frequency range being selected from the group consisting of a cell phone's carrier frequency range and an FM-radio's carrier frequency range.

7. The apparatus of claim 4, which further comprises:

said radio frequency communication device selected from the group consisting of a mobile communications device, FM radio, two-way radio, PDA, cell phone, laptop computer and palmtop computer.

8. The apparatus of claim 4, which further comprises:

said filter having characteristics of a low pass filter with a high attenuation at radio frequencies.

9. The apparatus of claim 4, which further comprises:

a first pair of parallel capacitors coupled between said first terminal of said receiving coil and ground potential, configured as an RF bypass for the carrier frequency range of the communication device, to bypass to ground the radio frequency noise.

10. The apparatus of claim 9, which further comprises:

a second pair of parallel capacitors coupled between said second terminal of said receiving coil and ground potential, configured as an RF bypass for the carrier frequency range of the communication device, to bypass to ground the radio frequency noise.

11. The apparatus of claim 4, which further comprises:

a first group of three parallel capacitors coupled between said first terminal of said receiving coil and ground potential, configured as an RF bypass for the carrier frequency range of the communication device, to bypass to ground the radio frequency noise.

12. The apparatus of claim 11, which further comprises:

a second group of three parallel capacitors coupled between said second terminal of said receiving coil and ground potential, configured as an RF bypass for the carrier frequency range of the communication device, to bypass to ground the radio frequency noise.

13. The apparatus of claim 4, which further comprises:

said receiving coil and said transmitting coil being printed wiring coils configured to be positioned in a coplanar, juxtaposed relationship in close proximity to one another to enhance contact-less electromagnetic induction there between.

* * * * *